US012270496B2

(12) United States Patent
Kumar et al.

(10) Patent No.: US 12,270,496 B2
(45) Date of Patent: Apr. 8, 2025

(54) HINGED QUICK-RELEASE CONNECTOR

(71) Applicant: SPM Oil & Gas Inc., Fort Worth, TX (US)

(72) Inventors: Chandu Kumar, Fort Worth, TX (US); Joe Allen Sutton, Weatherford, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 151 days.

(21) Appl. No.: 17/905,117

(22) PCT Filed: Feb. 26, 2021

(86) PCT No.: PCT/US2021/020101
§ 371 (c)(1),
(2) Date: Aug. 26, 2022

(87) PCT Pub. No.: WO2021/174129
PCT Pub. Date: Sep. 2, 2021

(65) Prior Publication Data
US 2023/0139413 A1 May 4, 2023

Related U.S. Application Data

(60) Provisional application No. 62/982,017, filed on Feb. 26, 2020.

(51) Int. Cl.
*F16L 23/08* (2006.01)
*F16L 23/22* (2006.01)

(52) U.S. Cl.
CPC ............... *F16L 23/08* (2013.01); *F16L 23/22* (2013.01)

(58) Field of Classification Search
CPC ......... F16L 23/08; F16L 23/22; F16L 17/067; F16L 29/02
USPC .................................................... 248/49–74.5
See application file for complete search history.

(56) References Cited

U.S. PATENT DOCUMENTS

| 3,432,189 | A | * | 3/1969 | Buller | F16L 27/113 |
| | | | | | 285/348 |
| 4,128,219 | A | * | 12/1978 | Kaigler, Jr. | F16L 1/026 |
| | | | | | 248/55 |
| D263,332 | S | * | 3/1982 | Butterfield | D8/396 |
| 4,586,688 | A | * | 5/1986 | Hartman | A01K 97/10 |
| | | | | | 248/538 |
| 4,698,641 | A | * | 10/1987 | Evans | H01Q 1/125 |
| | | | | | 343/882 |

(Continued)

OTHER PUBLICATIONS

International Search Report and Written Opinion issued in Application No. PCT/US2021/020101; Dated May 19, 2021, 8 Pages.

*Primary Examiner* — Muhammad Ijaz

(57) ABSTRACT

A quick-connector assembly for joining abutting flanged ends of two tubular members includes first and second connector portions joined by a rotatable hinge having a hinge pin coupling the first connector portion and the second connector portion so that the first and second connector portions encircle about abutting flanged ends of the tubular members when the first and second connector portions are in a closed position. Further, a stand having a bracket with at least one hole for accommodating the hinge pin is designed to at least partially support the weight of the connector assembly and the flanged ends of the tubular members.

19 Claims, 5 Drawing Sheets

(56) References Cited

U.S. PATENT DOCUMENTS

| | | | | |
|---|---|---|---|---|
| 4,897,952 | A * | 2/1990 | Hawie | A01K 97/08 211/60.1 |
| 5,380,052 | A | 1/1995 | Hendrickson | |
| 5,873,522 | A * | 2/1999 | Roberts | B05B 15/625 248/176.1 |
| 5,873,550 | A * | 2/1999 | Phillips | F16L 3/1075 248/74.1 |
| 6,561,471 | B1 * | 5/2003 | Hawie | F16M 11/041 248/74.1 |
| 7,204,525 | B2 * | 4/2007 | Matzner | F16L 21/065 277/609 |
| 7,861,982 | B1 * | 1/2011 | McClure | E21B 17/1035 285/364 |
| 8,794,456 | B2 * | 8/2014 | Olivier | A47B 81/007 211/70.4 |
| D721,652 | S * | 1/2015 | Smith | D13/149 |
| 11,933,434 | B1 * | 3/2024 | Andersen | F16L 23/22 |
| 2005/0205722 | A1 * | 9/2005 | Krueger | F16L 3/1215 248/62 |
| 2006/0197344 | A1 * | 9/2006 | Henry | F16L 23/10 285/420 |
| 2014/0375051 | A1 * | 12/2014 | Ikushima | F16L 23/22 285/363 |
| 2021/0247007 | A1 * | 8/2021 | Artsiely | F16L 23/22 |
| 2021/0324982 | A1 * | 10/2021 | Koehler | F16L 23/08 |
| 2022/0333721 | A1 * | 10/2022 | Jenney | F16L 47/14 |
| 2023/0139413 | A1 * | 5/2023 | Kumar | F16L 17/067 285/367 |
| 2023/0148383 | A1 * | 5/2023 | Nakano | F16J 15/104 277/602 |
| 2023/0167931 | A1 * | 6/2023 | Yamada | F16L 23/08 285/27 |
| 2024/0077157 | A1 * | 3/2024 | von Breitenbach | F16L 23/08 |

* cited by examiner

HINGED QUICK-RELEASE CONNECTOR

CROSS-REFERENCE TO RELATED APPLICATIONS

This Patent Application is a 371 national stage of PCT Application No. PCT/US2021/020101 filed on Feb. 26, 2021, entitled "HINGED QUICK-RELEASE CONNECTOR," which claims priority to U.S. Provisional Application No. 62/982,017, filed on Feb. 26, 2020, entitled "HINGED QUICK-RELEASE CONNECTOR," and assigned to the assignee hereof. The disclosures of the prior Applications are considered part of and are incorporated by reference into this Patent Application.

FIELD

The present disclosure relates to oilfield pipe connectors, and in particular, to a hinged quick-release connector for oil well applications.

BACKGROUND

In some oil field service operations such as hydraulic fracturing, cementing, acidizing and the like, frac fluids are pumped at high pressure down the well. In some cases, the fluid pressures may be in excess of 15,000 psi. Typically, an operator brings high pressure pumping equipment to the well site and installs temporary service flowlines from the high-pressure pumps to the wellhead. Because high volumes of fluid may also be needed, a number of pumping units may be connected together at one well site using a number of flowlines.

The flowline components include joints or sections of steel pipe of differing lengths, various junctions, valves, swivels and the like. Generally, each well site differs, and the workers have to arrange the flowlines or irons to extend around and past a variety of well site equipment. Many connections have to be made up, and each connection must be able to withstand the high-pressure frac fluids flowing in the lines. The workers need to be able to quickly make and break out the connections to minimize the time for each job.

A hammer union is a common type of connector used for temporary flowlines where the two flowline components have ends that abut each other. Generally, a collar fits loosely on one end, the collar having internal threads for engaging threads on the end of the other flowline component. The collar has external lugs, and the workers mechanically deliver blows to the lugs to tighten the collar around the flowline components. While these hammer union systems generally work well, there are disadvantages. The larger size flowline irons can be fairly heavy, and the two ends being joined together have to be elevated above the ground to tighten the hammer union. A worker might sustain an injury while lifting the flowline ends and simultaneously delivering blows with a hammer to tighten the hammer union. In very cold climates, the hammer union could shatter or break during installation. Sparks can be created by delivering the blows, which could create an explosion if any combustible gas is present in the vicinity. The task of connecting the flowline components with a hammer union is thus physically taxing and time consuming.

Another type of temporary oilfield service flowline uses clamps to clamp the ends of the flowlines together. The workers employ wrenches to secure multiple bolts that draw the clamp halves together. The weight and unwieldy nature of the flowlines and the clamps also make the installation and servicing job challenging.

A prior safety iron connector is disclosed in U.S. Pat. No. 7,204,525. This connector has two C-shaped portions that are bolted together around the flanged ends of flowlines using two sets of fasteners.

DETAILED DESCRIPTION

Figure 1:
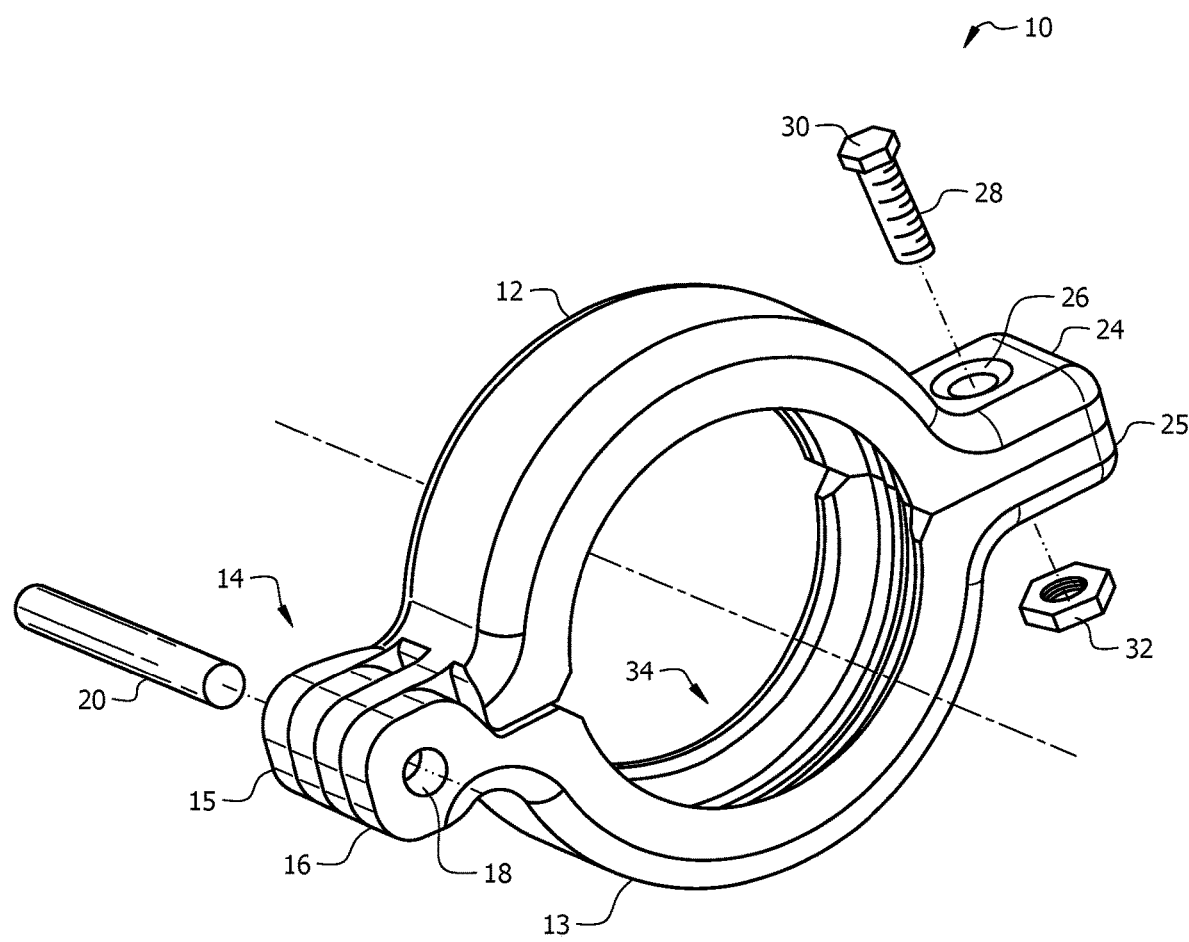
FIG. 1 is a perspective view of an embodiment of a hinged quick-release connector according to the teachings of the present disclosure.
Figure 2:
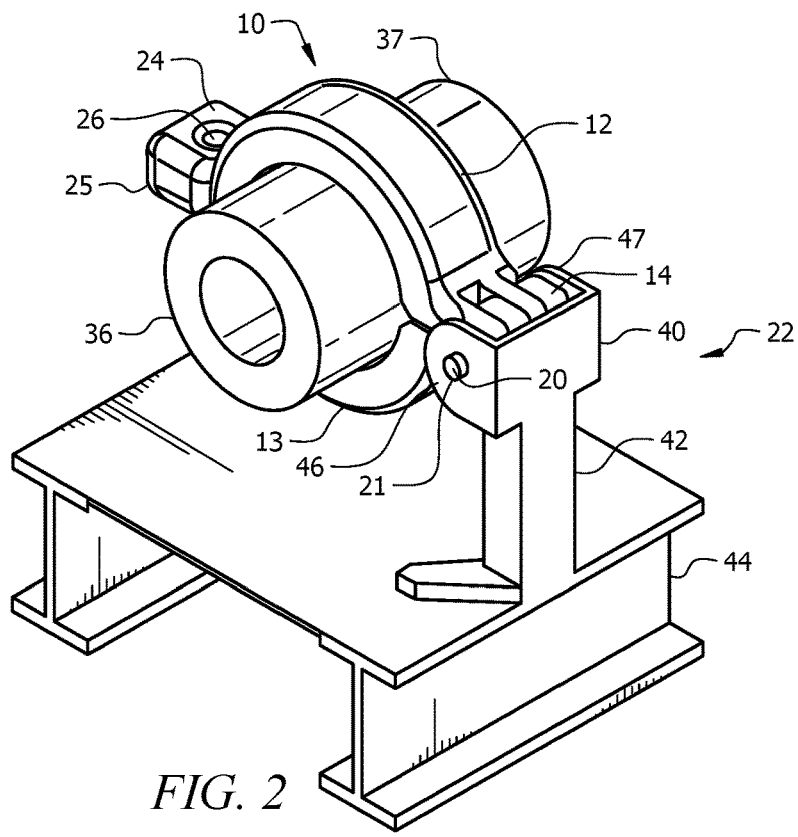
FIGS. 2 and 3 are perspective views of an embodiment of the hinged quick-release connector being supported by its hinge pin in the closed and open positions according to the teachings of the present disclosure.
Figure 3:
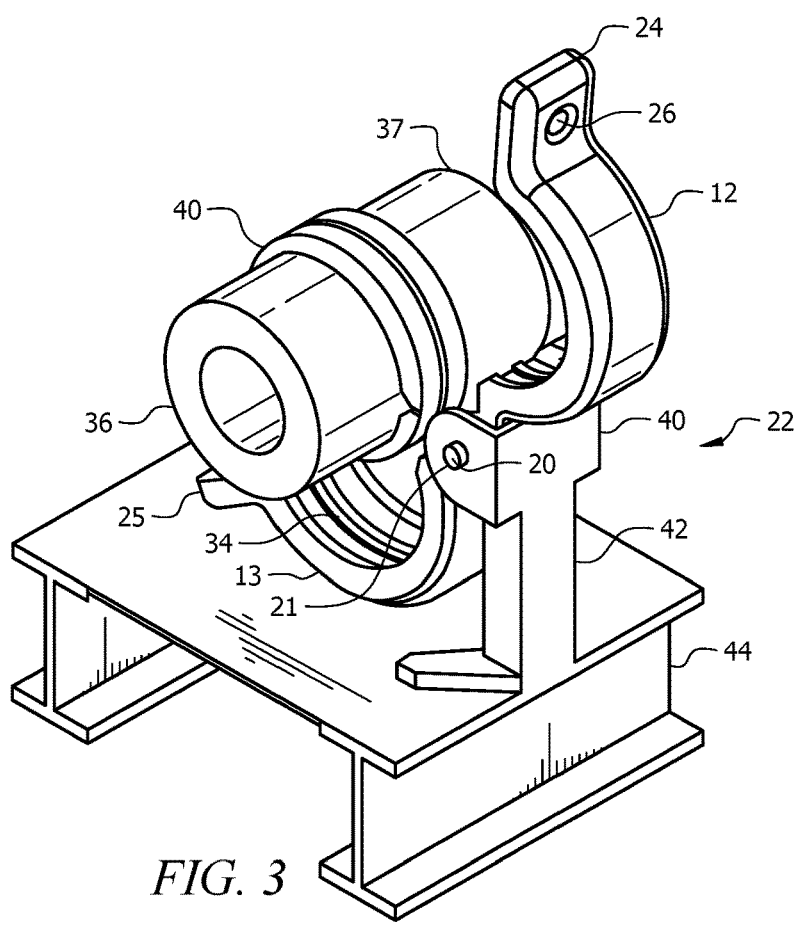

Referring to FIG. 1, a hinged quick-release connector 10 of the present disclosure is a clamp assembly with two semi-circular clamp portions 12 and 13, where the two clamp portions are rotatably coupled by a hinge 14. The hinge 14 may be any suitable rotatable coupling mechanism where the hinge portion 15 of one half of the connector interlaces the hinge portion 16 of the other half of the connector. The hinge 14 incorporates a through-hole or opening 18 that is designed to receive a hinge pin 20 that can be used in combination with through-holes 21 of a stand 22 to support the weight of the connector, as shown in FIGS. 2 and 3. The through-hole 18 and the hinge pin 20 may be engaged via a threaded interface or be engaged via friction-fitting. The hinge through-hole 18 is generally parallel with the longitudinal axis of the connector 10. The clamp portions 12 and 13 also each has a protruding lug 24 and 25 with a coaxial through-hole 26. When the clamp portions 12 and 13 are in the closed position, the through-hole 26 of the lugs 24 and 25 of each clamp portion 12 and 13 are in alignment so that they may accept a single fastener 28, such as a bolt to secure the lugs 24 and 25 together. Preferably, the inside surface of the through-hole 26 in the lugs 24 and 25 are threaded. The bolt 28 may have a head 30 having a diameter larger than the diameter of the through-hole 26 and has drive surfaces for engagement by a tool, such as a socket of an air impact wrench. The bolt 28 may be retained within the hole 26 by the use of another fastener, such as a threaded nut 32. One or more grooves 34 are defined within the inside surfaces of the clamp connector 10 that corresponds to the profile of the abutting flanges 40 of the flowline end portions 36 and 37 as shown in FIG. 3.

As shown, the clamp connector 10 is closed in FIG. 2 and open in FIG. 3. One or both ends of the hinge pin 20 may be supported by the stand 22, so that the connector's weight can be at least partially supported while workers physically maneuver and move it into place to clamp around the flanged ends of the two flowlines 36 ad 37. The hinge pin 20 may also incorporate an eyelet, a flange, or another feature that enables the hinge pin to be supported by another structural element. An exemplary embodiment of the stand 22 includes a bracket 40 that is supported by a vertical post 42 that is firmly erected on the ground or on a stable base or foundation 44. The bracket 40 comprises two prongs 46 and 47 each with a through-hole 21 that are sized to accommodate the hinge pin 20. The bracket 40 is shaped so that it does not interfere with the operations of the clamp to enable the clamp 10 to open and shut while its hinge pin 20 is supported by the stand 22. For example, the two-pronged bracket 40 may be C-shaped, square-shaped, or rectangular-shaped.

Figure 4:
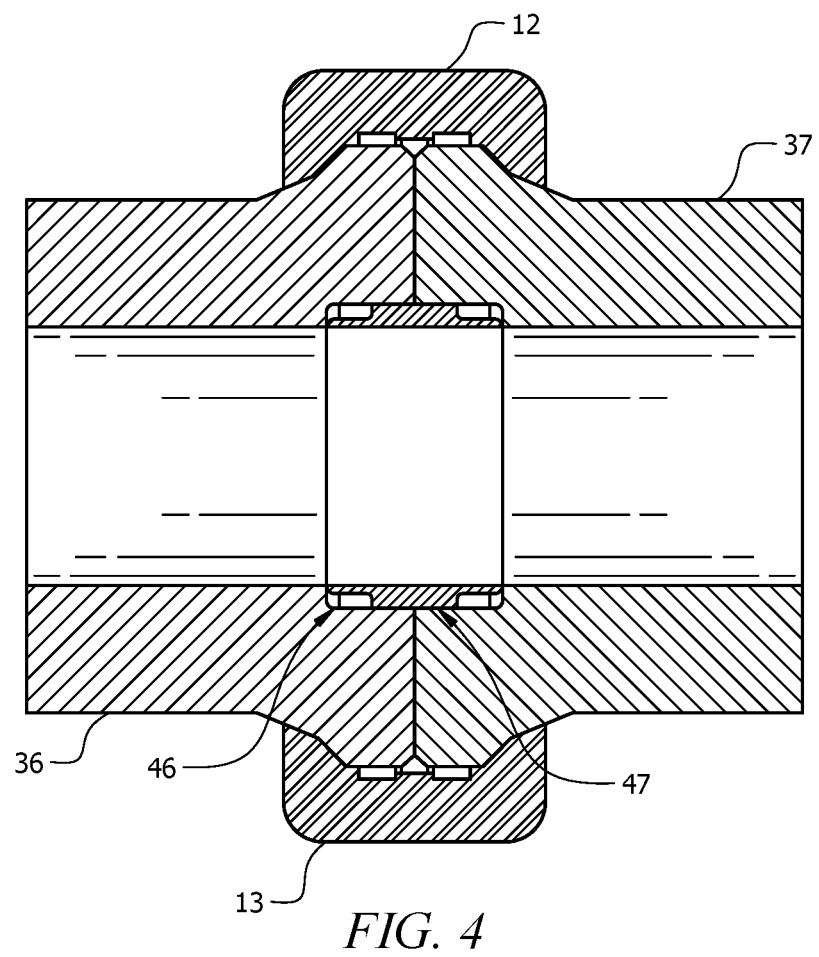
FIG. 4 is a cross-sectional view of an embodiment of a hinged quick-release connector joining the flanged ends of two conduits according to the teachings of the present disclosure.

Referring to FIG. 4, in the closed position, the inside contour of the two clamp portions 12 and 13 of the connector 10 form a circle that encircles the two flanged ends of two adjoining flowline members 36 and 37 such as the ends of two tubular pipes or safety irons. The hinged quick-release connector 10 can be used to connect pipes, valves, swivels and other common flow components used to connect the frac pump to a well. The inside contour of the connector 34 is designed to fit around the end flanges 40 of the two adjoining members (of a flowline, valve, swivels, etc.) 36 and 37 that are abutted together. The inside contour of the two portions 12 and 13 of the connector 10 therefore function to force the two end flanges 40 together and maintain the connection when the clamp portions are in the closed position. One or more seals, such as an elastomer seal 46 and a seal gland 47 may be disposed at the interface between the two abutting ends of the adjoining members 36 and 37.

Figure 5:
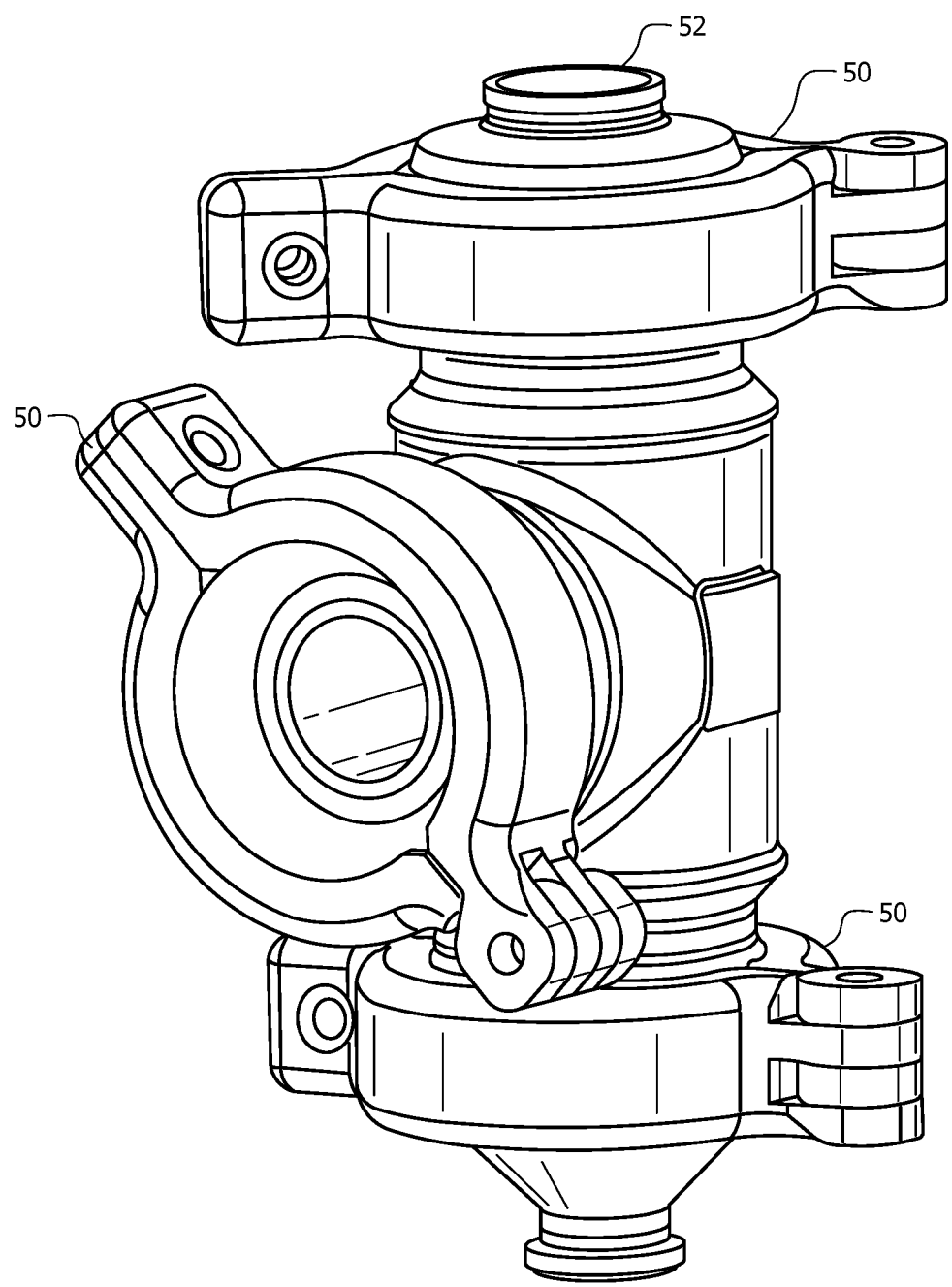
FIG. 5 is a perspective view of an embodiment of the hinged quick-release connector being used to join sections of a valve assembly according to the teachings of the present disclosure.
Figure 6:
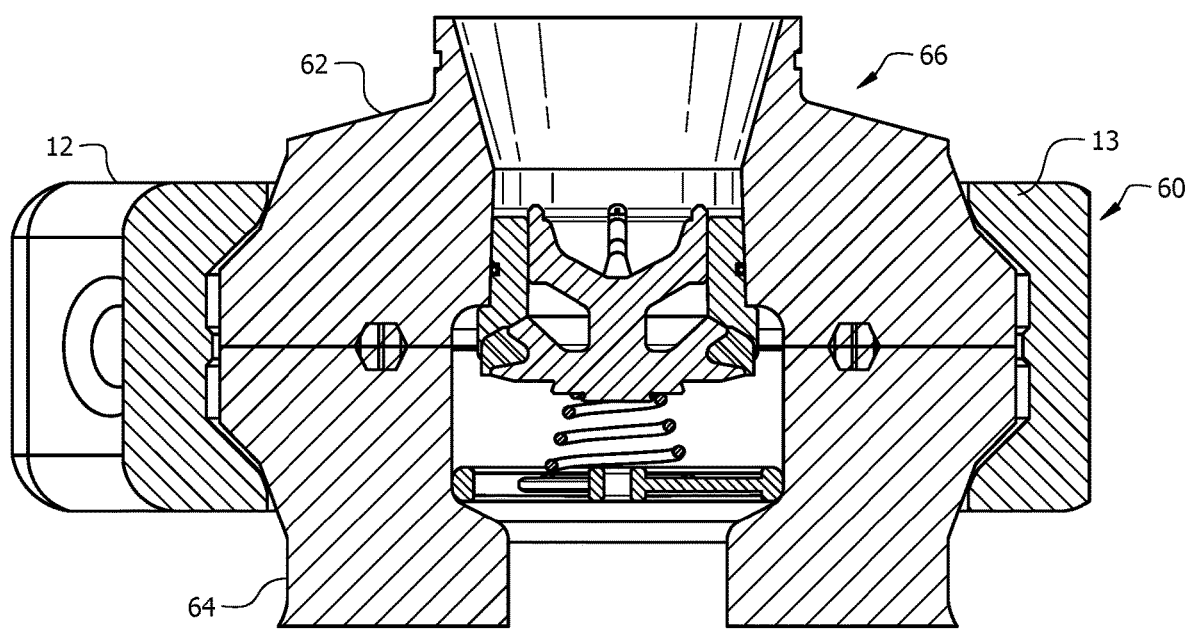
FIG. 6 is a cross-sectional view of an embodiment of the hinged quick-release connector joining sections of a valve assembly according to the teachings of the present disclosure.

FIG. 5 is a perspective view of hinged quick-release connectors 50 (hinge pin and fastener not explicitly shown) being used to join flanged components of a valve assembly 52 according to the teachings of the present disclosure. FIG. 6 is a cross-sectional view of a hinged quick-release connector 60 being used to join the flanged components 62 and 64 of a valve assembly 66. It should be noted that the inside contours of the connector may be shaped to accommodate the flanged profiles of components that are being joined together. Further, the inside contours of the connector need not be circular in shape. For example, a hinged connector with a square inside contour would be used to clamp around the flanged ends of conduits that have a square cross-section profile.

The features of the present invention which are believed to be novel are set forth below with particularity in the appended claims. However, modifications, variations, and changes to the exemplary embodiments described above will be apparent to those skilled in the art, and the hinged quick-release connector described herein thus encompasses such modifications, variations, and changes and are not limited to the specific embodiments described herein.

What is claimed is:

1. A quick-connector assembly for joining abutting flanged ends of two tubular members, comprising:
   a first connector portion;
   a second connector portion;
   a rotatable hinge having a hinge pin coupling the first connector portion and the second connector portion so that the first and second connector portions encircle about abutting flanged ends of the tubular members when the first and second connector portions are in a closed position;
   a stand having a bracket having at least one hole for accommodating the hinge pin and having a vertical post for at least partially supporting a weight of the quick-connector assembly and the flanged ends of the tubular members.

2. The quick-connector assembly of claim 1, wherein first and second connector portions each comprises about a half circumference of the quick-connector assembly.

3. The quick-connector assembly of claim 1, wherein an inner contour of the first and second connector portions are configured to correspond to a profile of the abutting flanged ends of the tubular members.

4. The quick-connector assembly of claim 1, wherein an inner surface of the first and second connector portions define at least one circumferential groove configured to correspond to a profile of the abutting flanged ends of the tubular members.

5. The quick-connector assembly of claim 1, wherein the bracket comprises two prongs each with a through-hole sized to accommodate the hinge pin.

6. The quick-connector assembly of claim 1, wherein the first and second connector portions each comprises a lug that accepts a fastener for securely fastening the first and second connector portions around the flanged ends of the tubular members.

7. A connector assembly for joining two flanged members, comprising:
   a first connector portion having a protruding lug defining an opening;
   a second connector portion also having a protruding lug defining an opening;
   a hinge rotatably coupling the first connector portion and the second connector portion;
   a stand having a bracket coupled to the hinge and configured to at least partially support a weight of the connector assembly and the flanged members; and
   the quick-connector assembly is in a closed position when first and second connector portions encircle about the flanged members and a fastener is inserted through the openings of the protruding lugs of both portions and secured thereto.

8. The connector assembly of claim 7, wherein first and second connector portions each comprises about a half circumference of the quick-connector assembly.

9. The connector assembly of claim 7, wherein an inner contour of the first and second connector portions are configured to correspond to a profile of the flanged members.

10. The connector assembly of claim 7, wherein an inner surface of the first and second connector portions define at least one circumferential groove configured to correspond to a profile of the flanged members.

11. The connector assembly of claim 7, wherein the bracket comprises two prongs each with a through-hole sized to accommodate a hinge pin coupling the hinge.

12. The connector assembly of claim 7, wherein the first and second connector portions each comprises a lug that accepts a fastener for securely fastening the first and second connector portions around the flanged members.

13. A connector assembly for joining two flanged members, comprising:
   a first connector portion having a protruding lug defining an opening;
   a second connector portion also having a protruding lug defining an opening;
   a hinge having a hinge pin rotatably coupling the first connector portion and the second connector portion;
   a stand coupled to the hinge pin and configured to support a weight of the connector assembly; and the quick-connector assembly is in a closed position when first and second connector portions encircle about the flanged members and a fastener is inserted through the openings of the protruding lugs of both portions and secured thereto.

14. The connector assembly of claim 13, wherein first and second connector portions each comprises about a half circumference of the quick-connector assembly.

15. The connector assembly of claim 13, wherein an inner contour of the first and second connector portions are configured to correspond to a profile of the flanged members.

16. The connector assembly of claim 13, wherein an inner surface of the first and second connector portions define at least one circumferential groove configured to correspond to a profile of the flanged members.

17. The connector assembly of claim 13, wherein the stand comprises a bracket coupled to the hinge and having a vertical post for at least partially supporting the weight of the connector assembly.

18. The connector assembly of claim 17, wherein the bracket comprises two prongs each with a through-hole sized to accommodate a hinge pin of the hinge.

19. The connector assembly of claim 13, wherein the first and second connector portions each comprises a lug that accepts a fastener for securely fastening the first and second connector portions around the flanged members.

\* \* \* \* \*